United States Patent
Isaak et al.

(10) Patent No.: US 10,201,989 B2
(45) Date of Patent: Feb. 12, 2019

(54) METHOD FOR INPUTTING PRINT DATA FOR PRINTING UPON A PRINT OBJECT USING A PRINTER AND PRINTER FOR IMPLEMENTING THE METHOD

(71) Applicant: PHOENIX CONTACT GMBH & CO. KG, Blomberg (DE)

(72) Inventors: Peter Isaak, Detmold (DE); Albrecht Schierholz, Schieder-Schwalenberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 15/775,900

(22) PCT Filed: Nov. 11, 2016

(86) PCT No.: PCT/EP2016/077410
§ 371 (c)(1),
(2) Date: May 14, 2018

(87) PCT Pub. No.: WO2017/081236
PCT Pub. Date: May 18, 2017

(65) Prior Publication Data
US 2018/0326753 A1 Nov. 15, 2018

(30) Foreign Application Priority Data
Nov. 13, 2015 (DE) .......................... 10 2015 119 642

(51) Int. Cl.
*H04N 1/04* (2006.01)
*B41J 11/00* (2006.01)
(Continued)

(52) U.S. Cl.
CPC ........... *B41J 11/009* (2013.01); *B41J 3/4075* (2013.01); *B41J 11/06* (2013.01); *G06K 7/1413* (2013.01)

(58) Field of Classification Search
CPC ...... B41J 11/009; B41J 11/006; G06F 7/1413; G41J 3/4075
(Continued)

(56) References Cited

U.S. PATENT DOCUMENTS

| 9,053,396 B2 | 6/2015 | Schierholz | |
| 2003/0072019 A1* | 4/2003 | Haines | H04N 1/00681 |
| | | | 358/1.12 |
| 2007/0002372 A1* | 1/2007 | Sekizawa | G11B 27/034 |
| | | | 358/1.15 |

FOREIGN PATENT DOCUMENTS

| DE | 10 2007 036 374 A1 | 2/2009 |
| DE | 10 2010 037 564 A1 | 2/2012 |

* cited by examiner

*Primary Examiner* — Houshang Safaipour
(74) *Attorney, Agent, or Firm* — David S. Safran; Roberts Mlotkowski Safran Cole & Calderon, P.C.

(57) ABSTRACT

A method for inputting print data for printing on a print object with a printer having a housing, a printing device, a holding device for an exchangeable magazine which holds the print object to be printed on, a control and evaluation unit, a memory and an input and display apparatus. Inputting print data is facilitated by the following steps of the method: inserting a magazine having the print object into the holding device outside of the printing chamber; moving the holding device into the printing chamber, optically sensing a marking arranged on the print object and/or on the magazine; selecting an input screen, from a plurality of input screens stored in the memory on the basis of the marking of the inserted print object sensed and/or on the magazine sensed (Continued)

by the sensor; and displaying the selected input screen or screens on the input display apparatus.

10 Claims, 8 Drawing Sheets

(51) Int. Cl.
*G06K 7/14* (2006.01)
*B41J 3/407* (2006.01)
*B41J 11/06* (2006.01)

(58) Field of Classification Search
USPC ........................................................ 358/1.12
See application file for complete search history.

METHOD FOR INPUTTING PRINT DATA FOR PRINTING UPON A PRINT OBJECT USING A PRINTER AND PRINTER FOR IMPLEMENTING THE METHOD

BACKGROUND OF THE INVENTION

Field of the Invention

The invention relates to a method for inputting print data for printing upon a print object using a printer, the printer having a housing with a print space made within the housing, a printing device, a receiving device for an interchangeable magazine which is used to accommodate the print object to be printed upon, a control and evaluation unit, a memory and an input and display apparatus. In addition, the invention relates to a corresponding printer for implementing the method.

Description of Related Art

In industrial and commercial practice, to identify and label machines, devices, terminals, cables or leads, different types of identification and marking labels are used on which information with respect to the components to which they are assigned is applied. For this purpose the identification or marking labels are conventionally provided in a printer with a corresponding print pattern, generally alphanumeric characters. Different printers with different printing methods, for example inkjet printers, thermal transfer printers or UV printers, are used for marking. These marking printers are known for example from the catalog "Markierungssysteme Werkzeuge Montagematerial [Marking Systems, Tools, Assembly Material] 2013/2014", pages 28 to 37 of Phoenix Contact GmbH & Co. KG.

In practice print objects in card format which have a host of individual marking labels are often used. The print objects which are also often called markers, are made in particular as plastic molded parts or as plastic stamped parts. In plastic molded parts which are also called Universal Card Material (UniCard or UC material), the marking labels are attached via ties in an outer frame. After printing, the individual marking labels which are often used for marking of leads and cables or for terminal marking are parted from the frame.

In plastic stamped parts which are also called Universal Sheet Material (UniSheet or US material) several rows of marking labels together form a marker, after printing upon the US material the individual marking labels can be separated from one another.

Moreover, several identification or marking labels can also be applied, in particular can be cemented onto a common carrier sheet, from which the individual identification or marking labels can be easily removed after marking. These carrier sheets are often also called lettering sheets or label sheets in practice.

The different kinds of markers are generally called print objects in the following, the print objects consisting of different materials, in particular different plastics, and they can have different dimensions, in particular different material thicknesses. In order to be able to print upon the different print objects with their different dimensions by a printer, the individual print objects in this method or in the printer under consideration are inserted into a magazine which fits the print object. Generally, several print objects can be inserted individually into a magazine so that the number of print objects is greater than the number of magazines. When all magazines have the same outside dimensions, each magazine can be inserted into the receiving device of the printer which can be moved in the manner of a drawer between a loading and unloading position outside the print space and a printing position within the print space.

Thermal transfer printers have turned out to be especially suitable for printing upon these print objects. In thermal transfer printing a special film which is coated with a temperature-sensitive ink is guided through between the print object and a thermal printing head as a printing device, the film as an ink ribbon being located in a corresponding printer cassette. With thermal transfer printing an exact ink imprint and high print quality can be produced with high luster. But for this purpose it is necessary in any case for the print parameters, such as temperature, printing speed, material and thickness of the print object and of the ink ribbon to be matched to one another.

In the printer under consideration which is preferably a thermal transfer printer, it is to be possible to print upon a host of different print objects. For the printer there is then a plurality of different magazines which can be inserted respectively into the receiving device. Moreover, several different printer cassettes with different ink ribbons can be used. Therefore, the user must be very careful in the choice of the individual components since otherwise, in spite of corresponding labelling of the individual components, there is the risk that the printer is being used with components which are not matched correspondingly to one another.

German Patent Application DE 10 2010 037 564 A1 and corresponding U.S. Pat. No. 9,053,396 B2 disclose a print object for a thermal transfer printer in which the print object as identification has a bar code identification with a host of successive individual lines, the identification being detected by an optical sensor which is located in the printer. When using the print objects known from German Patent Application DE 10 2010 037 564 A1 and corresponding U.S. Pat. No. 9,053,396 B2, it can thus be ensured that the actual printing process is only carried out when the user has inserted the correct print object into the printer.

If the printer is made as a desktop printer which is generally the case in thermal transfer printers known from practice for printing upon print objects in card format, the printing parameters and the print data which are used for the actual labelling of the print object are input using special software, the inputting taking place on external computers using graphic user interfaces. This type of input of print data is very convenient for the user, especially since the printing parameters and print data are often already made available by corresponding software packages. The manual preparation of individual print data for certain print objects is also relatively convenient on external computers with conventional keyboards and corresponding large displays as well as due to the use of a corresponding graphic input software.

In the mobile use of portable printers, the printing parameters and the print data are conversely input using the input and display apparatus which is provided on the printer and which has only relatively limited dimensions and often only few function keys. Here too the inputting of printing parameters and print data can be supported by corresponding software by corresponding menu items and selection filters being displayed or suggested to the user. But if the printer is to be designed to be able to print upon a plurality of different print objects, the user must first select the print object to be printed upon via several filters and menu items before he can start with the inputting of print data into the input screen which is intended for the print object and which is often also called the printer form. The time spent in the selection of the input screen and the risk of choosing an incorrect input screen and thus faulty inputs increases to the extent in which the number of the print objects which can be printed upon by the printer increases.

SUMMARY OF THE INVENTION

Therefore, the object of this invention is to simplify the input of print data for printing upon a print object using a printer, in particular a thermal transfer printer, in the initially described method. The input of print data by the user on site is also convenient and simple in a portable printer. Moreover, the object of the invention is to make available a corresponding printer for implementing the method.

This object is achieved in the method in accordance with the invention having the following steps:

Insertion of a magazine with the print object to be printed upon into the receiving device, the receiving device being located in a loading and unloading position outside the print space.

Running of the receiving device into the print space, at least one optical sensor located in the housing detecting an identification located on the print object and/or at least one optical sensor located in the housing detecting an identification which is located on the magazine.

Selecting of a suitable input screen from a plurality of input screens stored in the memory by the control and evaluation unit using the identification of the inserted print object detected by the sensor or selection of individual input screens from the plurality of input screens stored in the memory by the control and evaluation unit using the identification of the inserted magazine which has been detected by the sensor.

Displaying of the selected input screen or of the selected input screens on the input and display apparatus.

Thus, in the method in accordance with the invention the selection of the print object to be printed up which under certain circumstance is very time-consuming and fault-susceptible via the input and display apparatus provided on the printer is at least simplified or even completely replaced by its being automatically recognized which print object and/or which magazine the user has chosen in the running of the receiving device with the inserted magazine and the print object to be printed upon into the print space. The automatic recognition of the inserted print object and/or of the magazine used is then used by the control and evaluation unit to select corresponding input screens from a plurality of input screens which are filed in the memory and to display them on the input and display apparatus. In the memory of the printer, for this purpose, all input screens of the print objects which can be printed upon by the printer are filed in a corresponding table.

If an identification which is located on the magazine and which corresponds to a code assigned to the magazine is detected by an optical sensor located in the housing, the control and evaluation unit can determine using the detected identification or the corresponding code which magazine is currently inserted in the receiving device and then can select the input screens which are assigned to this magazine. Since only a small number of the print objects which can be printed upon altogether by the printer can be inserted in a magazine, via the recognition of the inserted magazine a selection of input screens which can fit the corresponding print objects which can be inserted in the magazine is possible.

If a printer is designed, for example, to print on 200 different print objects, for which for example there are 40 different magazines for accommodating the individual print objects, by the above described recognition of the inserted magazine the number of possible input screens can be reduced accordingly so that a type of preselection takes place. Subsequently, the user need only choose the input screen designed for the print object which has actually been inserted from the correspondingly reduced number of possible input screens which are being displayed on the input and display apparatus. The user thus need no longer choose among 200 possible input screens, but, for example, only among 5 input screens. This distinctly reduces the amount of time spent in the selection of the correct input screen and also diminishes the risk of choosing an incorrect input screen.

When the receiving device is being run into the print space, if a corresponding optical sensor detects an identification which is located on the inserted print object and which corresponds to a code which has been assigned to the print object, the control and evaluation unit can directly choose the input screen which is designed for the inserted and detected print object from the set of input screens stored in the memory. After displaying the input screen which has been chosen in this way, the user can then begin directly with the inputting of the print data into the input screen by means of the input and display apparatus.

The running of the receiving device into the print space is preferably started by the user pressing a corresponding button or a corresponding key when he has inserted the magazine with the print object into the receiving device.

By using at least one optical sensor, in particular a reflex light scanner, an identification which is located on the print object or on the magazine can be easily and economically detected. The identification is preferably a bar code identification, consisting of several individual lines. If the extension of the identification is parallel to the direction in which the receiving device is moving, to detect such a bar code identification a single optical sensor which is located securely in the housing is sufficient since then when the receiving device is being run into the print space the bar code identification is moved past the optical sensor.

According to one advantageous configuration of the method in accordance with the invention, an identification located on the print object and also an identification located on the magazine are detected. Preferably, in the printer housing there are at least one optical sensor for detecting the identification on the print object and at least one optical sensor for detecting the identification on the magazine. But fundamentally one optical sensor can also be used to detect both the identification on the print object and also the identification on the magazine. If when the receiving device is being run into the print space both the identification of the print object and also the identification of the magazine are detected, this leads first of all to at least partially redundant information with respect to a suitable input screen which can be used for error detection by the control and evaluation unit.

Preferably, the detection of the identification of the inserted print object and of the inserted magazine is used not only for selection of the correct input screen, but also to protect the printing process. This prevents a print object from being printed upon although the components which have been inserted into the printer by the user—the print object and magazine—are not matched to one another; this could otherwise lead to printing with reduced quality.

In the control and evaluation unit, the identification of the inserted magazine which has been detected by the sensor is compared to an identification stored in the memory for a magazine which is allowable for the print object to be printed upon. In this way it is checked whether the print object has in fact also been inserted into a magazine which is intended for the print object to be printed upon. Thus, a print object in poorer print quality can be prevented from being printed upon because the user has unintentionally inserted a magazine which is not intended for the selected print object into the receiving device or has inserted a print object into a magazine which is not intended for it.

Within the scope of this invention, it has been ascertained that the quality of the print pattern printed on the print object also depends on there being a magazine in the receiving device which is explicitly intended for the print object which is to be printed upon. If conversely a magazine has been chosen into which the print object does mechanically fit since the contact area made in the magazine is large enough, nevertheless printing in a poorer print quality can occur. This can be the case, for example, when the depth of the contact area in the magazine is not matched exactly to the material thickness of the print object so that in the printing process the distance between the print object and the printing device, in particular the thermal printing head of a thermal transfer printer, does not correspond to the actually intended optimum distance.

If the comparison undertaken in the control and evaluation unit yields the identification of the inserted magazine detected by the sensor not agreeing with identifications stored in the memory for a magazine which is suitable for the print object, a corresponding error message is output. The error message can be, for example, the flashing of a corresponding display or an alarm tone.

The error massage is preferably a corresponding display in a printer display. To continue the printing process, it can be provided that the error message must be actively acknowledged by the user, that the further execution of the printing process is thus interrupted until the user acknowledges the error message and has corrected the error. The initialization of the printing process, in particular the input of the print data into a corresponding input screen, is interrupted until the error has been corrected, i.e., the correct print object and the matching magazine are located in the receiving device.

According to another preferred configuration of the method in accordance with the invention, as a result the printer cassette which has been inserted into the printer is moreover also checked for whether it is a printer cassette which is suitable for the selected print object and is thus allowable. After inserting an interchangeable printer cassette which has a corresponding identification into the housing of the printer, the identification of the printer cassette is detected by means of at least one other optical sensor which is located in the housing. Then, a corresponding comparison of the identification of the inserted printer cassette which has been detected by at least one optical sensor to an identification filed in the memory for a printer cassette which is allowable for the print object to be printed upon takes place in the control and evaluation unit. Then an error message is output when the identification of the inserted printer cassette which has been detected by the sensor does not agree with the identification stored in the memory for an allowable printer cassette.

In the preferred configuration of the method in accordance with the invention, in addition to automatic selection of the input screen intended for the inserted print object it is thus also automatically checked whether all components which are necessary for the printing process and which have been chosen and inserted by the user are allowable for the printing process which is to be carried out.

According to another method step it can be provided that the selected input screen or the selected input screens are being displayed on the input and display apparatus only when beforehand the comparison of the identifications which has been carried out in the control-evaluation unit has not yielded a difference if therefore an allowable magazine and an allowable printer cassette have been inserted.

Moreover, it can also be provided as a further method step that when a difference has been ascertained in the comparison of the magazine identification which has been carried out in the evaluation unit, the receiving device travels out of the print space into the loading and unloading position outside the print space. The user can then directly remove the objectionable magazine and replace it by an allowable magazine.

The initially named object is achieved in a printer for executing the method in accordance with the invention which has a housing with a print space made within the housing, a printing device, a receiving device, a control and evaluation unit, a memory and an input and display apparatus. The receiving device is used to accommodate an interchangeable magazine in which the print object to be printed upon is located, the receiving device being movable between a loading and unloading position outside the print space and a printing position within the print space.

In accordance with the invention, in the housing there is at least one optical sensor for detecting an identification located on the print object and/or at least one optical sensor for detecting an identification located on the magazine. The respective magazine can therefore be detected by a sensor when the receiving device with the magazine and the print object inserted into it travels into the print space out of the loading and unloading position outside the print space.

The control and evaluation unit of the printer is made to select the input screen which is suitable or intended for the inserted print object and to display it on the input and display apparatus using the identification of the inserted print object detected by the sensor from a plurality of input screens which are stored in the memory. Alternatively, or in addition, the control and evaluation unit is made to select individual input screens from the plurality of input screens stored in the memory and to display them on the input and display apparatus using the identification of the inserted magazine which has been detected by the sensor.

In the printer in accordance with the invention, using the automatic detection of the print object by the control and evaluation unit the input screen intended for the print object can thus be displayed on the input and display apparatus so that the user can then begin directly with the input of the print data. Thus the user need no longer run through a host of menu items and filter inputs in a time consuming manner with the pressing of individual keys in order to select the inserted print object and thus the correct input screen. If instead of detecting the identification of the print object the detection of the magazine identification takes place, the number of possible input screens from which the user must select the correct one can be at least dramatically restricted. A magazine can for example be designed for 5 to 10 different print objects so that after detecting the magazine (only) these print objects or the input screens intended for these print objects from which the user must then choose the inserted print object or the correct input screen are displayed.

According to one preferred configuration of the printer in accordance with the invention, in the housing there are at least one optical sensor for detecting an identification located on the print object and one optical sensor for detecting the identification of the magazine. Since the print object together with the magazine is located in the receiving device, the use of one optical sensor at a time for detection of the identification of the print object and of the magazine is sufficient since the print object and the magazine move past the sensors when the optical sensors are located accordingly as the receiving device is running into the printing position.

Fundamentally, the use of a single optical sensor both for detecting the identification of the print object and also for detecting the identification of the magazine is sufficient if the identification on the print object and the identification on the magazine are located to one another such that they pass the optical sensor in succession when the receiving device is being run in. According to one preferred configuration, to detect the identification on the print object and to detect the identification on the magazine however there are however two optical sensors which are preferably located within the housing to one another such that their optical axes run essentially perpendicular to one another. If the direction in which the receiving device runs horizontally, this means that the optical axis of one sensor is likewise aligned horizontally while the optical axis of the other sensor runs vertically.

According to one preferred configuration of the printer, the control and evaluation unit is made to compare the magazine identification detected by the sensor to an identification stored in the memory for a magazine which is intended for the print object to be printed upon and which is thus allowable. Moreover, the control and evaluation unit initiates an error message when the completed comparison yields a difference between the detected identification and the stored identification.

In another configuration, in the housing of the printer there is at least one further optical sensor for detecting an identification located on an interchangeable printer cassette. Then in the evaluation unit the identification of the inserted printer cassette which has been detected by the sensor is compared to an identification stored in the memory for a printer cassette which is suitable for the print object which is to be printed upon.

If the identification according to one advantageous configuration is a bar code identification which arises from several individual lines located next to one another, several optical sensors are preferably used which are located next to one another in the housing, the arrangement of the sensors corresponding to the extension of the identification, in particular the arrangement of the individual lines of a bar code identification. If the bar code identification has, for example, six individual lines located next to one another, there are also then six optical sensors located next to one another in the housing, each individual line being located within the detection range of one optical sensor when the printer cassette is arranged correctly in the housing. By using several sensors, they can be located stationary in the housing even if the printer cassette, differently than the receiving device, is not moving past the sensors.

The individual identifications which are located on the components which are to be inserted by a user are preferably made bar code identifications. The individual bar code identifications have several individual lines which are located in succession and which each have a predetermined longitudinal extension and width. Typically, there are two types of individual lines, specifically on the one hand bright, in particular white individual lines, and on the other hand dark, in particular individual black lines so that the contrast between the two types of individual lines is maximum. The individual marks can then be especially easily detected by a reflex light scanner as an optical sensor.

In particular, at this point there are a host of possibilities for configuring and developing the method in accordance with the invention as well as the printer in accordance with the invention as will be apparent from the following description of preferred exemplary embodiments in conjunction with the drawings.

DETAILED DESCRIPTION OF THE INVENTION

Figure 1A:
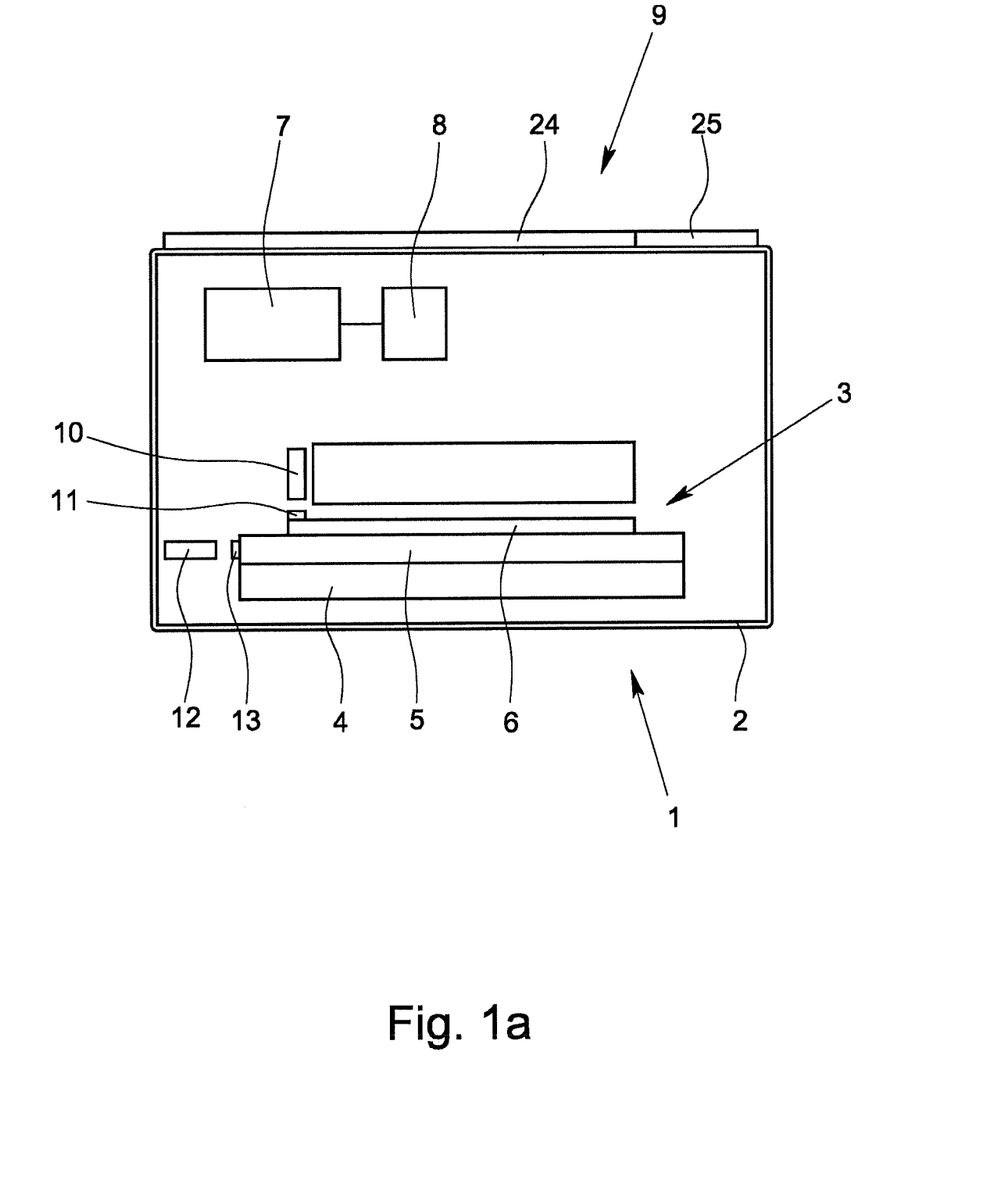
FIGS. 1a & 1b schematically show a printer in cross section and in longitudinal section, respectively, FIG. 2 schematically shows a receiving device of the printer, from the side.
Figure 1B:
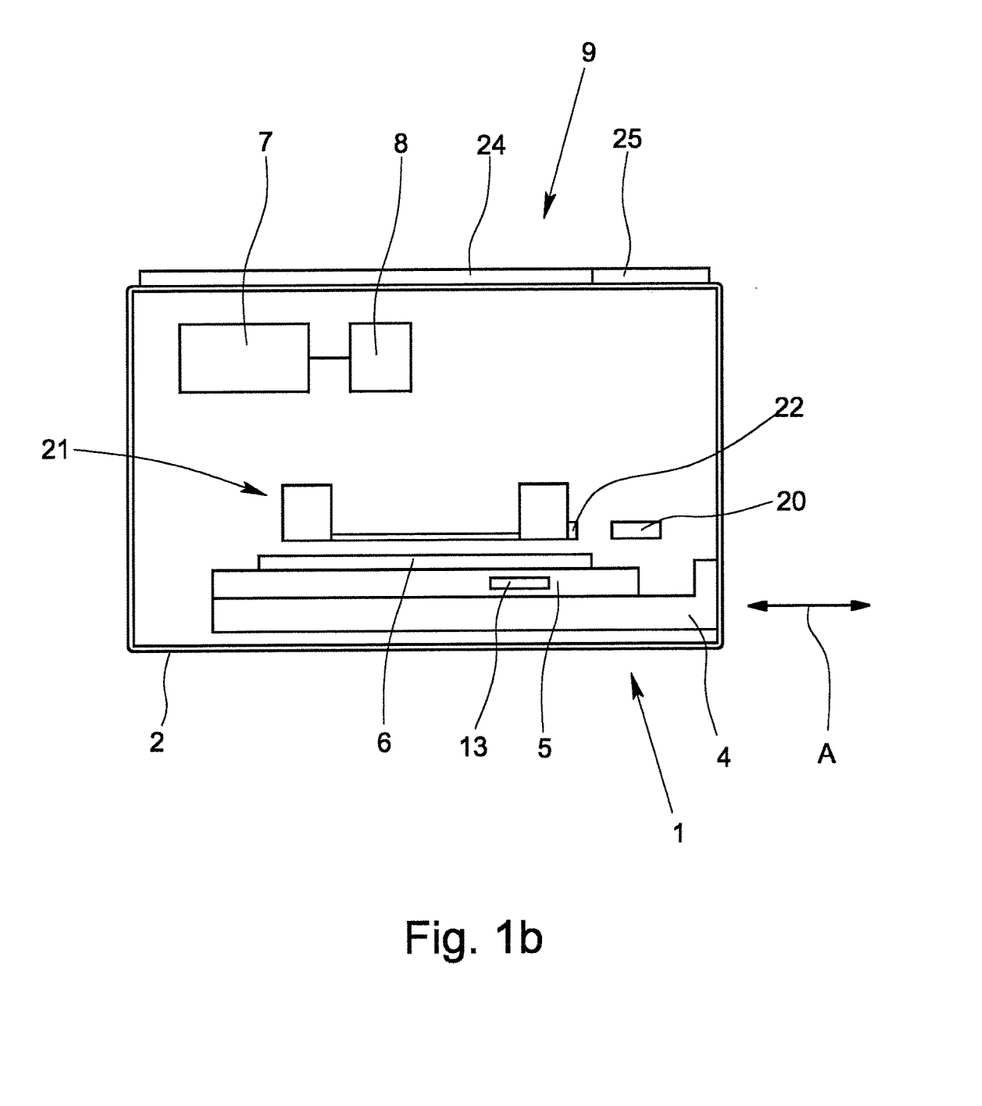

FIGS. 1a & 1b show a printer 1 according to this invention in a schematic, in cross section (FIG. 1a) and in a longitudinal section (FIG. 1b). The printer 1 is used to carry out the method in accordance with the invention, the printer 1 being preferably a thermal transfer printer. The printer 1 has a housing 2 in which a print space 3 is made. A receiving device 4 which is made in the manner of a drawer or transport carriage can be moved between a loading and unloading position outside the print space 3 and a printing position within the print space 3. The direction in which the receiving device 4 moves runs in FIG. 1a in the plane of the drawing and in FIG. 1b in the direction of the arrow A, in the two figures, the receiving device 4 being located within the print space 3, therefore in the printing position.

The receiving device 4 is used to accommodate a magazine 5 into which the print object 6 to be printed upon at the time can be inserted. This ensures that the print object 6 to be printed upon can be easily and conveniently introduced into the print space 3 and moreover is also always located there in a given position. So that different print objects 6 can be printed upon using the printer 1, the receiving device 4 is made to accommodate an interchangeable magazine 5 into which the print object 6 to be printed upon can be inserted. If a print object 6 is to be printed upon, it is inserted into a magazine 5 which is designed for the print object 6 and the magazine 5 with the print object 6 is inserted into the receiving device 4, for which the latter is in its loading and unloading position outside the print space 3. Of course, the magazine 5 can also be inserted first into the receiving device 4 and then the print object 6 can be inserted into the magazine 5.

To control the printing process, in the printer 1 there are moreover a control and evaluation unit 7 and a memory connected to the control and evaluation unit 7, both of which are shown only schematically in FIG. 1. The control and evaluation unit 7 is moreover also connected to the input and display apparatus 9 via which print parameters and print data can be displayed and input. The input and display apparatus 9 is made preferably as a touch screen which is located on the top of the printer 1.

As is apparent from FIG. 1a, in the printer 1 there is an optical sensor 10 which is used to detect an identification 11 attached to the print object 6. Moreover, within the housing 2 of the printer 1 is another optical sensor 12 which detects an identification 13 attached to the magazine 5. The two optical sensors 10, 12 are located within the housing 2 such that their optical axes run perpendicular to one another. In addition to this, in the two sensors 10, 12 the optical axis also runs perpendicular to the direction A in which the receiving device 4 moves, as is apparent from FIG. 1b. Since in addition the longitudinal extension both of the identification 11 of the print object 6 and also the identification 13 of the magazine 5 extends parallel to the direction A in which the receiving device 4 moves, the identifications 11, 13 located on the print object 6 and on the magazine 5 are routed past the respective sensors 10, 12 when the receiving device 4 is moving out of the loading and unloading position into the printing position within the print space 3. In this way, the two sensors 10, 12 can be located stationary in the housing 3. As is apparent from FIG. 1a, for this reason, the identification 11 of the print object 6 is located on its top surface, while the identification 13 is located on one side surface of the magazine 5.

Figure 2:
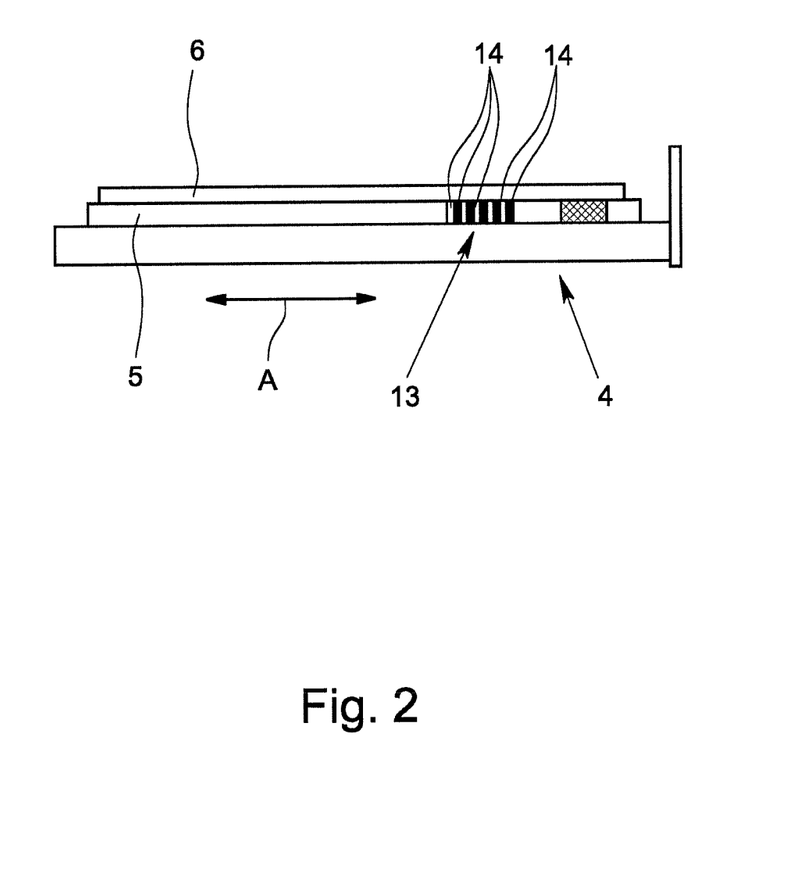

As is apparent from FIG. 2, the identification 13 of the magazine 5 is preferably a bar code identification which consists of several individual lines 14 which are arranged in succession. To detect the bar code identification 13 and the individual lines 14 a simple reflex light scanner can be used as the optical sensor 12. The optical sensor 12 recognizes whether the individual line 14 located in its optical axis is a bright, in particular white individual line 14 or a dark, in particular black individual line 14.

Figure 3:
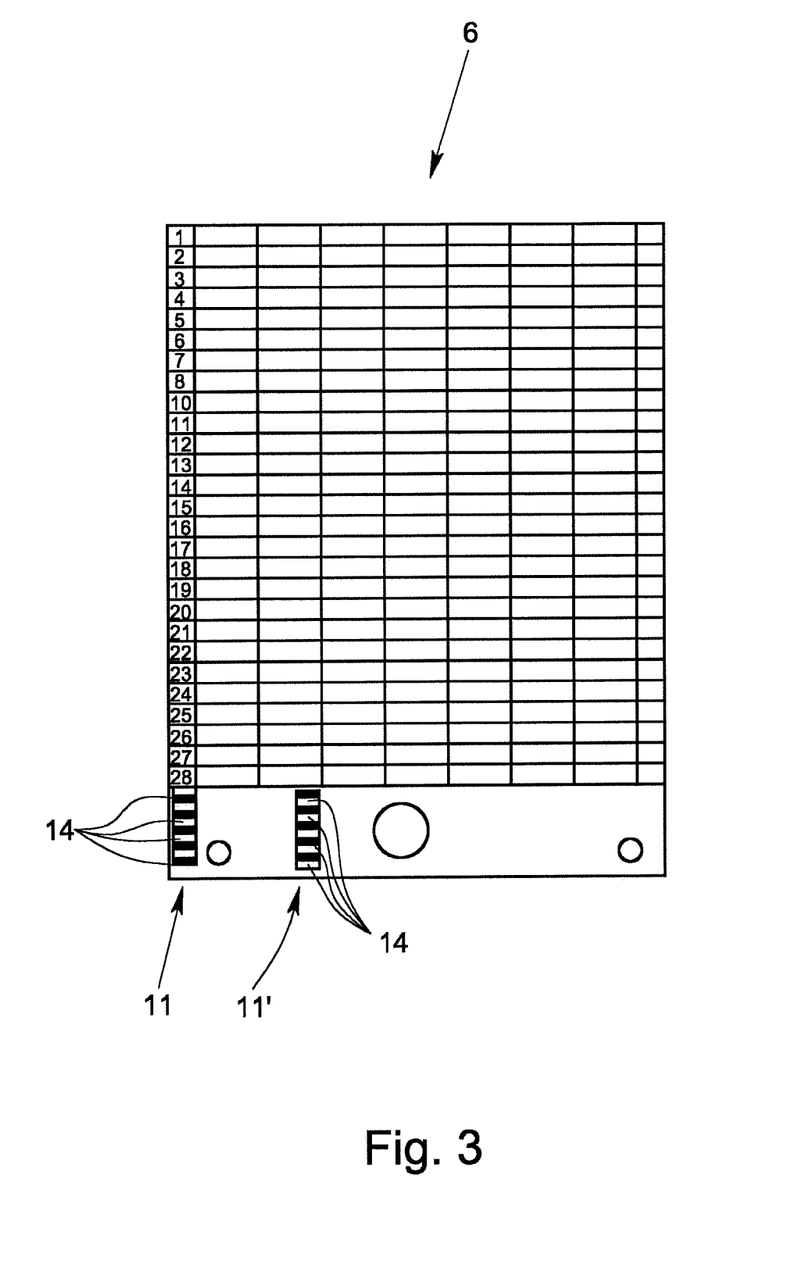
FIG. 3 shows a first exemplary embodiment of a print object.

The identification 11 of the print object 6 can likewise be made as a bar code identification, as is the case in the exemplary embodiment according to FIG. 3. Here a US material is shown as the print object 6 in which there is moreover a second identification 11' which is located parallel to the first identification 11 on the print object 6, the two bar code identifications 11, 11' being arranged turned by 180° to one another. There are two optical sensors 10 next to one another for simultaneous redundant detection of the two bar code identifications 11, 11' in the housing 2 of the printer 1.

Figure 4:
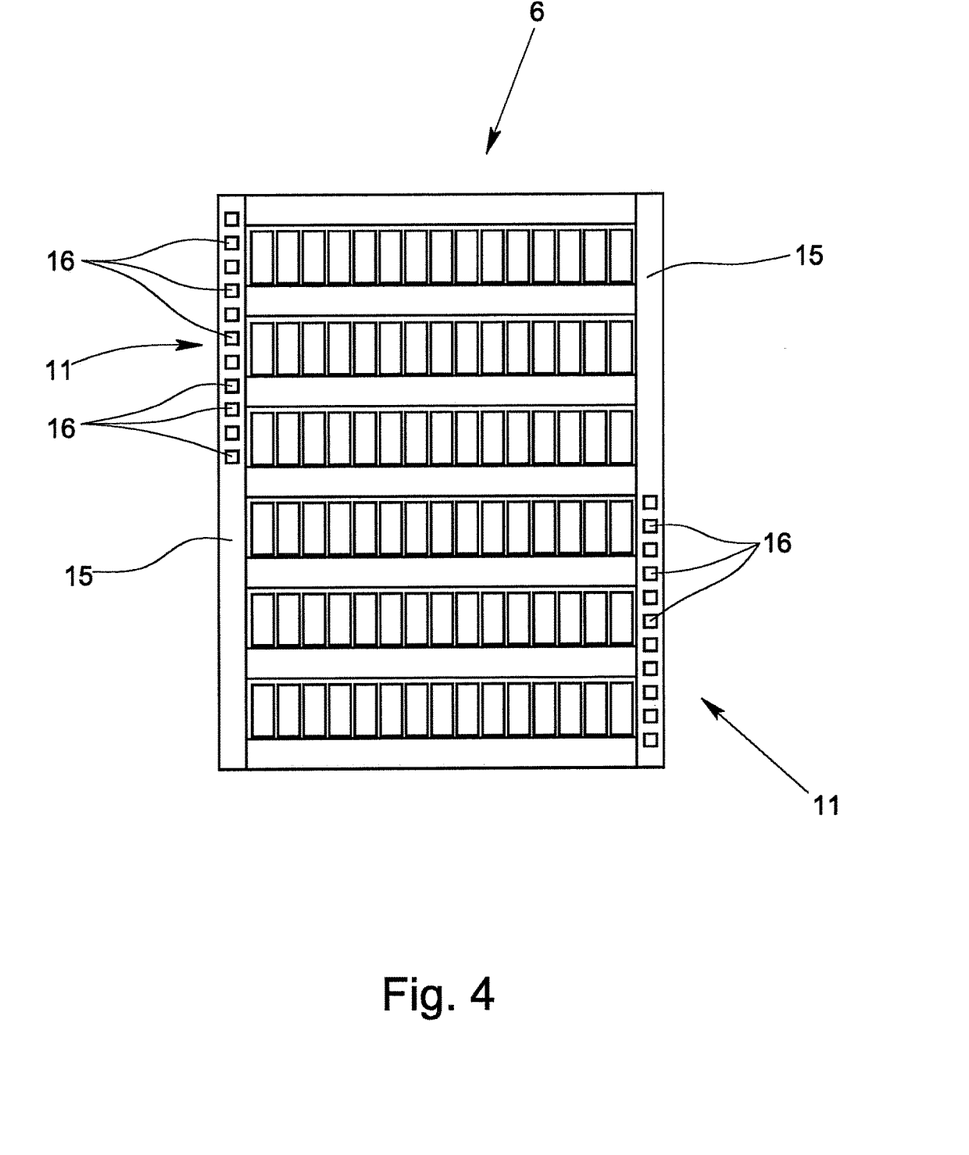
FIG. 4 shows a second exemplary embodiment of a print object, FIGS. 5a & 5b schematically show two input screens and two input windows on the input and display apparatus of a printer, respectively.

In the exemplary embodiment of the print object 6 according to FIG. 4 which shows a Universal Card Material (UC material), the identification 11 is made as a pattern of holes, i.e., in the edge region 15 of the print object 6 free holes 16 are made at given positions. In an identification 11 made as a pattern of holes the optical sensor 10 is preferably a photoelectric barrier so that it can be ascertained by means of the photoelectric barrier whether a hole 16 is made or not at given positions. If a hole 16 is made at a given position, a light beam which has been emitted from the transmitter of the photoelectric barrier travels through the hole 16 to the opposite receiver of the photoelectric barrier. If conversely a hole 16 is not made at a given position, the light beam which has been emitted by the transmitter is interrupted by the material of the edge region 15 of the print object 6 so that it does not reach the opposite receiver of the photoelectric barrier.

Figure 5A:
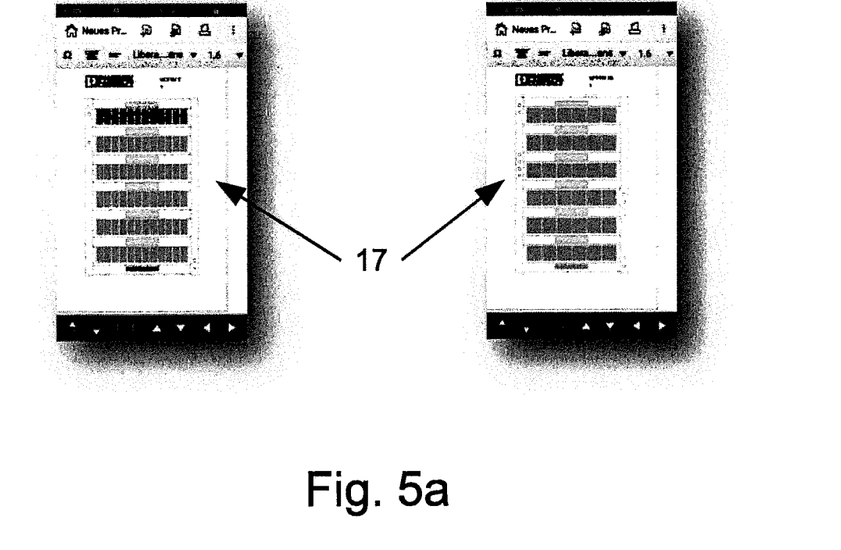

FIG. 5a shows two exemplary embodiments of an input screen 17, as it is displayed on the input and display apparatus 9 which is made as a touch screen. The respective input screen 17 has been selected by the control and evaluation unit 7 using the identification 11 of the inserted print object 6 detected by the sensor 10 so that tedious and time-consuming selection of the input screen 17 which fits the inserted print object 6 is not necessary for the printer 1 in accordance with the invention in which the method in accordance with the invention is being used. As can be recognized from a comparison of the two drawings in FIG. 5a, the two input screens 17 differ somewhat from one another since the two input screens 17 are intended for different print objects 6. The respective input screen 17 makes it possible for the user to easily and conveniently input the print data for the inserted print object 6 directly.

Figure 5B:
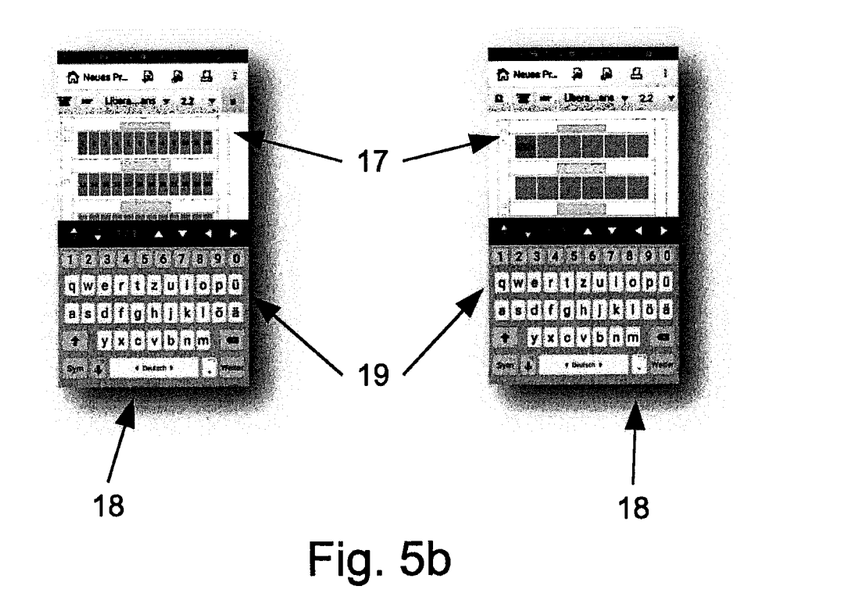

FIG. 5b shows the input windows 18 which correspond to the input screens 17, as are being displayed for input of print data on the input and display apparatus 9. The input window 18 in addition to a sector of the input screens 17 has a keyboard field 19. In this way the user can directly recognize in the inputting of print data via the keyboard field 19 what is being shown on the individual identification and marking labels of the print object 6 based on his input after printing. If only a small print object is being printed upon so that the input screen also has only small dimensions, the input screen can also be completely displayed in the input window.

Figure 6:
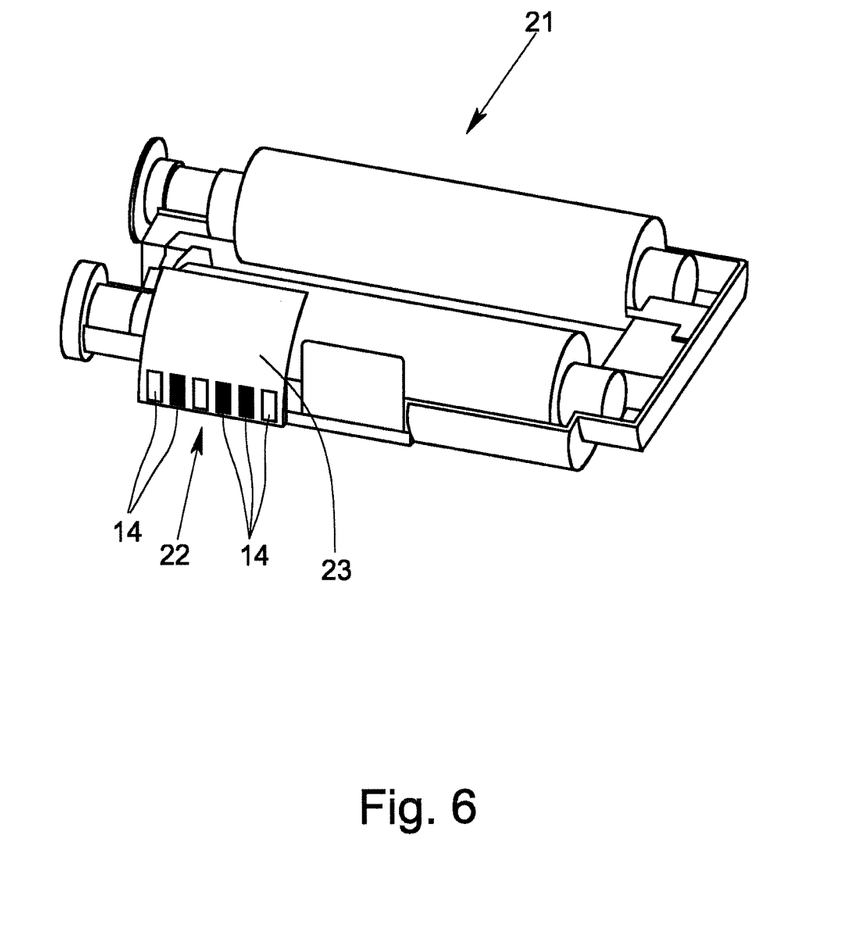
FIG. 6 shows a printer cassette of a printer, in a perspective.

In the preferred configuration of the printer 1 in accordance with the invention, in addition to the sensor 12 for the magazine 5 and the sensor 10 for the print object 6, there are several other sensors 20 for recognizing an identification 22 attached to the interchangeable cassette 21 in the housing 2. Since a printer cassette 21 which has been inserted into the housing 2 of the printer 1 is located stationary there, therefore does not move with the receiving device 4, to detect the identification 22 of the printer cassette 21 made likewise as a bar code, there are several optical sensors 20 in the longitudinal extension of the identification 22 next to one another in the housing 2. The optical sensors 20 which in FIG. 1b are located in succession in the plane of the drawing, are used for detection of one individual line 14 of the bar code identification 22 of the printer cassette 21. As can be recognized from FIG. 6, the identification 22 of the printer cassette 21 can be easily applied on a label 23 which is cemented at a given position on the printer cassette 21. Then preferably in addition the article designation, article number and optionally a logo can be applied on the label 23.

Figure 7:
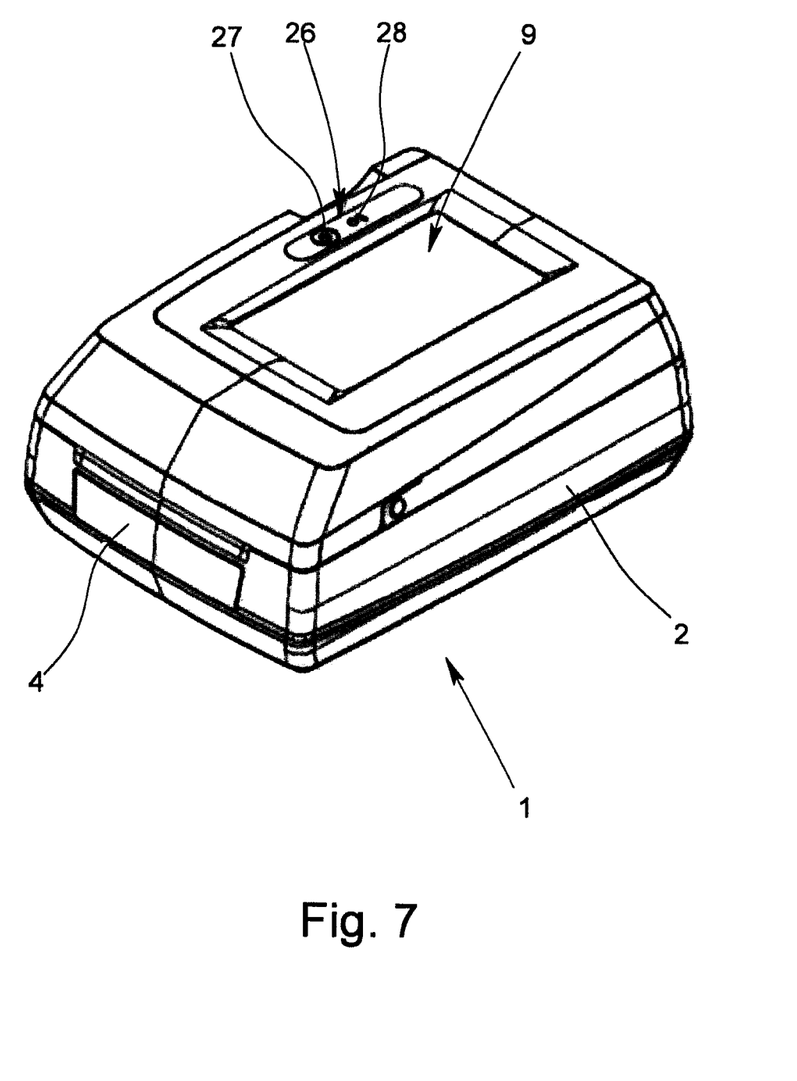
FIG. 7 is a perspective view of an exemplary embodiment of a printer.

FIG. 7 shows a perspective of one preferred configuration of a printer 1 in accordance with the invention as a thermal transfer printer. The printer 1 is made here as a portable device which due to its low weight of less than 10 kg and its small base which corresponds roughly to the dimensions of one DIN-A 4 sheet, can be placed if necessary at different application sites by the user. To carry out the desired print job the printer 1 on its top has a touch screen as an input and display apparatus 9. Alternatively, the input and display apparatus 9 can also have a separate display 24 as well as a separate keyboard 25, as is indicated in FIG. 1.

Moreover, it is apparent from the perspective view of the printer 1 in FIG. 7 that, in addition to the input and display apparatus 9, there is another control panel 26 in which in addition to an on/off switch 27 there is also a key 28 for running the receiving device 4 in. The method in accordance with the invention can thus be started by the key 28 being pressed after inserting the magazine 5 with the print object 6 into the receiving device 4 so that the receiving device 4 travels into the print space 3 in the housing 2.

What is claimed is:

1. A method for inputting print data for printing upon a print object with a printer, the printer having a housing with a print space within the housing, a printing device, a receiving device for an interchangeable magazine which accommodates the print object to be printed upon, a control and evaluation unit, a memory and an input and display apparatus, comprising the steps of:
inserting a magazine with the print object to be printed upon into the receiving device while the receiving device is located in a loading and unloading position outside of the print space,
moving the receiving device into the print space and using at least one optical sensor located in the housing for detecting an identification located on at least one of the print object or the magazine,
using the control and evaluation unit for at least one of selecting an input screen from a plurality of input screens stored in the memory based on the identification detected on the inserted print object by the at least one sensor or selecting those individual input screens stored in the memory that are suitable for the inserted magazine from a plurality of input screens stored in the memory based on the identification detected on the magazine by the at least one sensor, and
displaying the selected input screen or screens on the input and display apparatus.

2. The method as claimed in claim 1, further comprising the steps of:
using the control and evaluation unit for comparing the identification detected on the magazine by the at least one optical sensor to an identification stored in the memory for a magazine which is allowable for the particular print object which is to be printed upon, and
outputting an error message when the identification detected on the magazine by the at least one optical sensor does not agree with the identification stored in the memory for an allowable magazine.

3. The method as claimed in claim 1, further comprising the following steps:
inserting an interchangeable printer cassette into the housing, an identification being located on the printer cassette,
detecting the identification on the printer cassette by means of at least one optical sensor which is located in the housing,
using the control and evaluation unit for comparing of the identification detected on the inserted printer cassette by the at least one optical sensor to an identification stored in the memory for a printer cassette which is allowable for the print object which is to be printed upon,
outputting of an error message when the identification detected on the inserted printer cassette by the at least one optical sensor does not agree with the identification stored in the memory for an allowable printer cassette.

4. The method as claimed in claim 2, wherein the selected input screen is only displayed on the input and display apparatus when beforehand the at least one comparison of the identifications which has been carried out in the control-evaluation unit indicates the detected and stored identifications match.

5. The method as claimed in claim 2, wherein the receiving device travels out of the print space into the loading and unloading position when the identification of the inserted magazine which has been detected by the at least one sensor does not agree with the identification stored in the memory for an allowable magazine.

6. The method as claimed in claim 1, wherein running of the receiving device into the print space is started by pressing a corresponding button or a key.

7. A printer for printing upon a print object, comprising:
a housing with a print space therein,
a printing device with a receiving device for an interchangeable magazine for accommodating the print object which is to be printed upon,
a control and evaluation unit with a memory, and
an input and display apparatus,
wherein the receiving device is movable between a loading and unloading position outside of the print space and a printing position within the print space,
wherein at least one optical sensor for detection of an identification located on at least one of the print object or a magazine which has been inserted into the receiving device,
wherein the control and evaluation unit has means for at least one of selecting an input screen which is suitable for the inserted print object from a plurality of input screens stored in the memory based on the identification detected on the print object and for displaying the selected input screen on the input and display apparatus, or selecting those input screens which are suitable for the inserted magazine from a plurality of input screens stored in the memory based on the identification detected on the inserted magazine and for displaying the selected input screens on the input and display apparatus.

8. The printer as claimed in claim 7, wherein said at least one optical sensor in the housing comprises at least one optical sensor for detection of the identification located on the print object and at least one optical sensor for detection of the identification located on the magazine, wherein the at least one optical sensor for detecting the identification located on the print object and the at least one optical sensor for detecting the identification located on the magazine are arranged relative to one another such that their optical axes run essentially perpendicular to one another.

9. The printer as claimed in claim 8, wherein at least one further optical sensor is provided in the housing for detecting an identification which is located on an interchangeable printer cassette.

10. The printer as claimed in claim 9, wherein the optical sensors are reflex light scanners for detecting a respective bar code identification.

* * * * *